July 18, 1961 H. T. SCOTT, JR 2,993,138
DEVICE FOR DETECTING NEUTRON FLUX
Filed Aug. 11, 1955
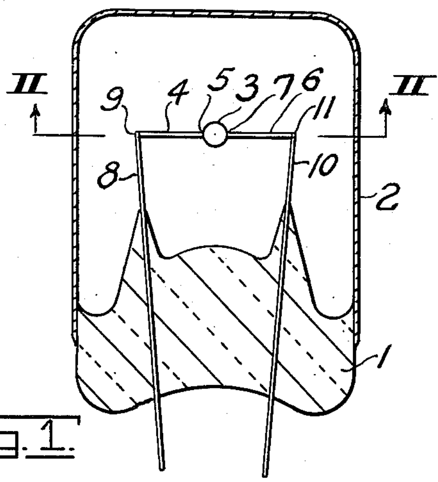
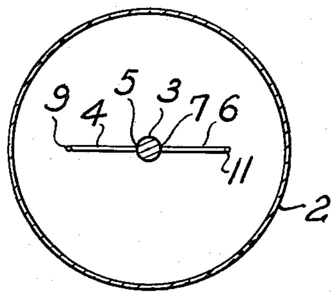
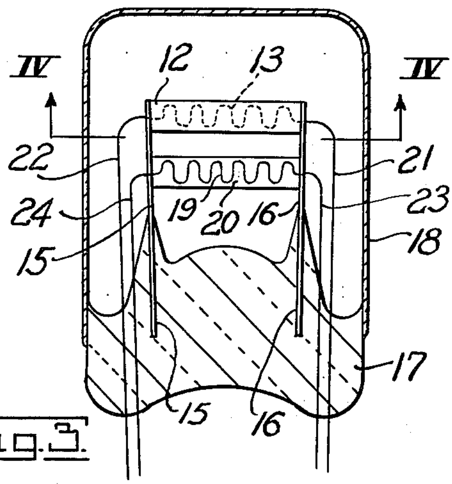
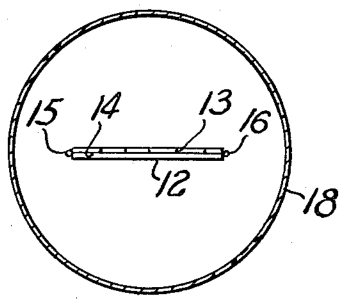
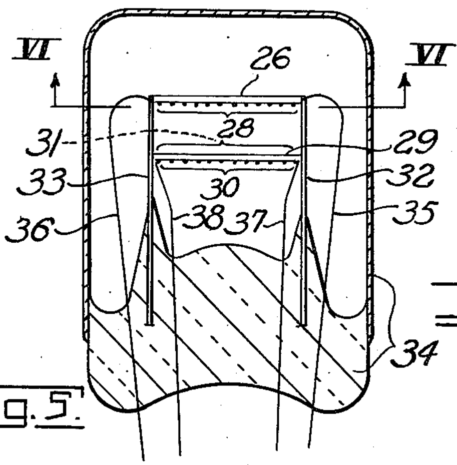
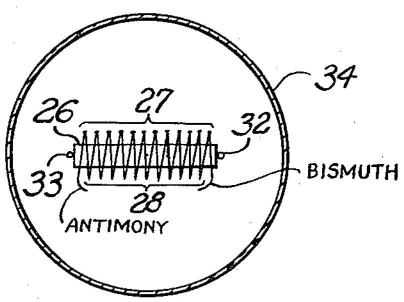
INVENTOR.
HOWARD T. SCOTT, JR.
BY
Zugelter & Zugelter
Attys.

United States Patent Office 2,993,138

Patented July 18, 1961

2,993,138

DEVICE FOR DETECTING NEUTRON FLUX

Howard T. Scott, Jr., 1238 Bihlman Drive, Portsmouth, Ohio

Filed Aug. 11, 1955, Ser. No. 527,840

3 Claims. (Cl. 313—61)

This invention relates to devices adapted to detect neutron flux and thereby make it adaptable for measurement.

The device of this invention utilizes the heat resulting from fissions in a subcritical mass of fissionable material as a measure of the neutron flux in which the device is placed. The release of heat in the fissionable material produces a change in temperature that is utilized to produce a measurable quantity. The quantity so produced provides for a measure of the neutron flux.

The heat developed by the fissions in the fissionable material may be utilized to heat a resistance element or elements so that by measuring the change in resistance or the voltage drops thereacross, the neutron flux can be determined.

The heat developed may also be used to energize the hot junction of a thermocouple whereby a voltage is generated. The magnitude of the voltage can be measured in any suitable manner and the value of the voltage at any particular instant will be a measure of the density of the neutron flux.

An object of the invention is to provide a device having thermo-sensitive resistance elements therein, on the surface of which is a subscritical mass of fissionable material which, when exposed to neutron flux, produces fissions in the mass, thereby generating heat which changes the resistance of one of the resistance elements and producing a measurable quantity that is a function of the neutron flux density.

Other objects of the invention will in part be apparent and will be part be obvious from the following description taken in conjunction with the accompanying drawing.

In the drawing:

FIGURE 1 is a view in vertical section of a device arranged and constructed in accordance with an embodiment of the invention;

FIG. 2 is a view in section taken on line II—II of FIG. 1.

FIG. 3 is a view in vertical section of a device arranged and constructed in accordance with an embodiment of the invention.

FIG. 4 is a view in section taken on line IV—IV of FIG. 3;

FIG. 5 is a view in vertical section of a still further modified form of device embodying the invention; and FIG. 6 is a view in section taken on line VI—VI of FIG. 5.

The device shown in FIGS. 1 and 2 comprises a press or base 1 having an envelope 2 of metal or glass. The material of the envelope should be opaque to ultraviolet rays and light and radiant heat. If the envelope is of glass, the inside surface is provided with a black coating which is opaque to ultraviolet rays and to light and radiant heat. Within the envelope 2 is a spherical, subcritical mass 3 of fissionable uranium ($U^{235}$) which is suspended between a bismuth wire 4 on one side forming junction 5, and an antimony wire 6 on the other side forming junction 7. The other end of bismuth wire 4 is joined to a copper wire 8 forming junction 9, and the other end of the antimony wire 6 is joined to a copper wire 10 forming junction 11. Stability of support for the detecting element which comprises elements 3, 4 and 6, is provided by partial encasement of copper wires 8 and 10 in the press 1. The whole unit is enclosed in the highly exhausted tube or envelope 1, which is painted black on the inside surfaces thereof to reduce heat transmission in the form of light and radiant heat.

Thermal neutrons striking the ($U^{235}$) sphere 3 cause fissions therein, the number of fissions being proportional to the concentration of the exciting thermal neutron flux. These fissions release energy in the form of heat (approximately $265.6\times10^{-6}$ ergs per fission) and this heat causes the temperature of the $U^{235}$ sphere to rise. This increase in temperature places junctions 5 and 7 at a higher temperature than junctions 9 and 11. Because of this difference in temperature, a thermoelectric potential develops between the bismuth wire 4 and the antimony wire 6.

The copper wires 8 and 10 serve as lead-in wires from junctions 9 and 11 to the exterior of the apparatus, and may be connected to highly sensitive voltage measuring equipment, whereby the voltage between these two wires is measured. This voltage provides a measure of the thermal neutron flux in which the ($U^{235}$) sphere is located or to which it is exposed. In this form the device measures thermal neutron flux only. By enclosing the critical mass 3 in a shield consisting of an outer layer of boron to absorb incident thermal neutrons and an inner layer of graphite to reduce fast neutrons to thermal neutrons velocities, the device of FIGS. 1 and 2 can be used to measure fast neutron flux.

In the preferred form of the invention illustrated in FIGS. 3 and 4, a small strip or ribbon 12 of fissionable uranium ($U^{235}$) of subcritical mass is joined in close physical contact with a resistance coil or wire 13 composed of platinum or other suitable resistance material which is wound on a strip of glass or other insulating material 14. The $U^{235}$ ribbon 12 and glass strip 14 are supported by wire support members 15 and 16 which are partially encased in the press 17 of the envelope 18. A second resistance coil 19 identical to resistance coil 13 is wound on a strip of glass or other insulating material 20. Glass strip 20 is attached to and supported by support members 15 and 16 and which is spaced some distance below resistance coil 13 i.e., to say, glass strip 20 is spaced a greater distance away from ribbon 12 than ribbon 12 is spaced from coil 13. Copper wires 21 and 22 extend through the device and serve as lead-in wires connected to resistance coil 13, while copper wires 23 and 24 similarly extend through the device and serve as lead-in wires connected to resistance coil 19, all as shown in FIG. 3. Envelope 18 may be painted black on the inside surface thereof to reduce heat transmission in the form of light and radiant heat.

Thermal neutrons striking the $U^{235}$ ribbon 12 cause fissions therein, the number of fissions being proportional to the density of the thermal neutron flux. These fissions release energy in the form of heat. Transfer of heat from the $U^{235}$ ribbon to resistance coil 13 is effected, and thereby increases the ohmic resistance thereof. Resistance coil 19 is not in contact with the $U^{235}$ ribbon and hence does not undergo a corresponding temperature increase.

The thermal neutron flux, to which the subcritical mass 12 is exposed, can be measured by connecting wires 21 and 22 to highly sensitive resistance measuring equipment, and similarly copper wires 23 and 24 may be connected to a similar resistance measuring device. The resulting difference between the resistance of coil 13 and of coil 19 is a measure of the thermal neutron flux in which the $U^{235}$ ribbon is located. In this form the device measures thermal neutron flux only. By enclosing the above resistance elements in a shield consisting of an outer layer of boron for absorbing incident thermal neutrons and an inner layer of graphite for reducing fast neutrons to thermal neutron velocities, the device can be used to measure fast neutron flux.

It should be noted here also that this particular embodiment of the invention is operative even though elements 19, 20, 23 and 24 have been omitted from the device. In other words, the resistance element 13 may be measured before and after exposure to a neutron source rather than measuring the resistance elements 13 and 19 after exposure to a neutron source.

In FIGS. 5 and 6 a plurality of bismuth and antimony wires are employed. For example, twelve bismuth wires and twelve antimony wires are mounted alternately, side by side on a glass strip 26. These wires are alternately joined at the ends, each bismuth wire forming a link between the antimony wires on either side. Twelve junctions 27 are formed on one side of the glass strip 26 and eleven junctions 28 are formed on the other side. The twelve junctions 27 are coated with a thin layer of fissionable uranium $U^{235}$. A second set of twelve bismuth wires and twelve antimony wires are mounted in an identical manner on a second glass strip 29. Twelve junctions 30 are formed on one side of glass strip 29 and eleven junctions 31 are formed on the other side. The twelve junctions 30 are coated with a thin layer of fissionable uranium $U^{238}$. Glass strips 26 and 29 are supported by wire support members 32 and 33 which are partially encased in the press of a highly evacuated envelope 34. Glass strip 29 is mounted a slight distance below strip 26. Copper wire 35 serves as the lead-in wire to the unattached end of bismuth wire on strip 26 and copper wire 36 serves as the lead-in wire to the unattached end of the antimony wire on strip 26. A copper wire 37 serves as the lead-in wire to the unattached end of bismuth wire on strip 29 and copper wire 38 serves as the lead-in wire to the unattached end of antimony wire on strip 29. The above elements as shown are enclosed in the highly exhausted glass tube 34 which may be painted black on the inside surface to reduce heat transmission in the form of light and radiant heat.

Thermal neutrons striking the $U^{235}$ coatings on junctions 27 cause fissions therein, the number of fissions being proportional to the density of the thermal neutron flux. These fissions release energy in the form of heat and this heat causes the temperature of junctions 27 to rise. This increase in temperature places junctions 27 at a higher temperature than junctions 28. As a result of this difference in temperature, a thermoelectric potential develops between each bismuth wire and its adjoining antimony wire. The sum of these individual thermoelectric potentials is impressed on the copper wires 35 and 36. In a similar manner fast neutrons (1 mev. and above) striking the $U^{238}$ coatings on junctions 30 cause fissions, the number of fissions being proportional to the density of the "fast" neutron flux. These fissions release energy in the form of heat, causing the temperature of the junctions 30 to rise. As a result of this difference in temperature, a thermoelectric potential develops between each bismuth wire and its adjoining antimony wire. The sum of these individual thermoelectric potentials appears across copper wires 37 and 38.

In use, the wires 35 and 36 are connected to a highly sensitive voltage measuring equipment and the voltage between them is measured. This voltage provides a measure of the density of the thermal neutron flux in which the device is located. Similar voltage measuring equipment may be employed to measure the voltage across wires 37 and 38. This voltage provides a concurrent measurement of the density of the "fast" neutron flux in which the device is located.

The invention above described embodies a new method of measuring neutron flux in which the heat produced by fissions in a subcritical mass of fissionable material is utilized to develop measurable quantities such as voltage or resistance changes. It has application in the operational control of reactors and particle accelerators, as an integral part of thickness and level gauges utilizing neutron sources, and serves as a means of detecting and measuring exposure of personnel to neutrons in the various energy ranges. Various forms of fissionable material may be employed in the invention. For example, the $U^{235}$ and $U^{238}$ can be replaced by other fissionable isotopes of uranium or of thorium, plutonium or americium, in varying quantities and geometrical shapes. The bismuth and antimony wires can be replaced by any combination of two different metals or alloys which will yield a measurable thermoelectric potential. The platinum of the resistance coil can be replaced with any suitable resistance material that will provide measurable resistance variations and the contact between the fissionable element and the resistance coil can be made by plating, encasement, or any other means that will provide adequate resistance and heat exchange. The device can be enclosed in any type of envelope whether it is under vacuum, at atmospheric pressure or under pressure of air, liquids or various gases.

Having thus described the invention, it will be apparent to those of ordinary skill in the art to which the invention pertains that various modifications and changes may be made in the illustrated embodiment thereof without departing from either the spirit or the scope of the invention.

Therefore, what is claimed as new and desired to be secured by Letters Patent is:

1. An apparatus for detecting neutron flux so as to make such flux adaptable for measurement, comprising an envelope, a ribbon of fissionable material within said envelope, a glass strip adjacent said ribbon, a wire wound on said strip and in physical contact with said ribbon, a second wire wound upon an insulating material at a greater distance away from said ribbon than said wire is from said ribbon, lead-in wires extending through the apparatus and connected to said wires, whereby a transfer of heat is effected from said ribbon to said wire upon energy through fission being released by said ribbon thereby increasing the ohmic resistance of said wire, the resulting difference between the resistances of said wires being a measure of neutron flux.

2. A device for detecting thermal neutron flux so as to make such flux adaptable for measurement, comprising an exhausted opaque envelope, a press for said envelope, a ribbon of fissionable material in said envelope supported by members partially encased in said press, a glass strip adjacent said ribbon, a resistance wire wound on said glass strip and in physical contact with said ribbon, an insulating glass strip, a second identical resistance wire wound on said insulating glass strip, said insulating glass strip supported by said members and spaced from said ribbon, lead-in wires extending through the device and connected to the ends of said resistance wires, whereby a transfer of heat is effected from said ribbon to said resistance wire upon energy through fission being released by said ribbon, thereby increasing the ohmic resistance of said resistance wire, the resulting difference between the resistances of said resistance wires being a measure of thermal neutron flux.

3. An apparatus for detecting neutron flux so as to make such flux adaptable for measurement comprising an envelope, a ribbon of fissionable material mounted in said envelope, an insulating strip adjacent said ribbon, a resistance wire wound on said strip and in physical contact with said ribbon, a second resistance wire insulated from and spaced a greater dstance away from said ribbon than said resistance wire from said ribbon, and lead-in wires extending through said apparatus and connected to said resistance wires, whereby a transfer of heat is effected from said ribbon to said first mentioned resistance wire upon energy through fission being released by said ribbon, thereby increasing the ohmic resistance of said wire.

the resulting difference between the resistances of said resistance wires being a measure of neutron flux.

References Cited in the file of this patent

UNITED STATES PATENTS

| | | |
|---|---|---|
| 2,558,919 | Zinn | July 3, 1951 |
| 2,564,626 | Mac Mahon et al. | Aug. 14, 1951 |
| 2,579,994 | Zinn | Dec. 25, 1951 |
| 2,677,772 | Moon | May 4, 1954 |
| 2,733,355 | McKee | Jan. 31, 1956 |
| 2,745,284 | Fitzgerald et al. | May 15, 1956 |
| 2,753,462 | Moyer et al. | July 3, 1956 |
| 2,811,649 | Atkins et al. | Oct. 29, 1957 |
| 2,814,731 | Werme et al. | Nov. 26, 1957 |